United States Patent [11] 3,601,983

[72] Inventor Jack Guillot
 Blanc-Mesnil, France
[21] Appl. No. 869,695
[22] Filed Oct. 27, 1969
[45] Patented Aug. 31, 1971
[73] Assignee Etablissements Bennes Marrel
 Saint-Etienne (Loire), France
[32] Priority Nov. 8, 1968
[33] France
[31] 50607

[54] BY-PASS VALVES FOR GAS TURBINES
 3 Claims, 5 Drawing Figs.
[52] U.S. Cl. .................................................. 60/39.16,
 60/262
[51] Int. Cl. .................................................. F02c 3/10
[50] Field of Search ........................................... 60/39.16,
 39.17, 39.18, 39.15, 262

[56] References Cited
 UNITED STATES PATENTS
 2,416,389 2/1947 Heppner ........................ 60/39.16 CR 2,587,649 4/1952 Pope ............................. 60/39.16 X
 2,759,327 8/1956 Huber ........................... 60/39.15 X
 3,324,655 6/1967 Kaplan .......................... 60/39.16
 3,508,403 4/1970 Neitzel .......................... 60/39.16 X Primary Examiner—Clarence R. Gordon
Attorney—Sughrue, Rothwell, Mion, Zinn & Macpeak ABSTRACT: A device for a gas turbine comprising a gas generator mechanically separated from an output rotary shaft, the latter carrying a turbine rotor, and at least one bypass valve located between the gas generator and the turbine output rotor, each bypass valve being submitted to the action of a calibrated spring which has a tendency to open it in order to partially deflect hot gases directly to exhaust, while the pressure of the air compressed in the gas generator before being sent into the combustion chambers acts in an opposite manner onto a piston fixed to each valve stem, said valve being closed again as soon as said air pressure reaches a predetermined value, above which the entire flow of hot gases produced in the gas generator, passes through the blades of the output rotor, the bypass valves remaining closed.

BY-PASS VALVES FOR GAS TURBINES

The present invention relates to the improvements in gas turbines. It concerns more particularly a device adapted to facilitate the starting-up, to improve the accelerations during transitory phases, and to reduce fire hazards comparatively to devices of known type. Therefore, such a device is particularly suitable for gas turbines for use in automotive vehicles or in lorries.

A device according to the invention is mounted in a gas turbine comprising a gas generator mechanically separated from an output rotary shaft, the latter carrying a turbine rotor, and it is chiefly noteworthy in that it comprises one or several bypass valves located between the gas generator and the turbine output rotor, each of those bypass valves being submitted to the action of a calibrated spring which has a tendency to open it in order to partially deflect hot gases directly to exhaust, while the pressure of the air compressed in the gas generator before being sent into the combustion chambers acts in an opposite manner onto a piston fixed to each valve stem, said valve being closed again as soon as this air pressure reaches a predetermined value, above which the entire flow of hot gases produced in the gas generator, passes through the blades of the output rotor.

In a preferred embodiment of the invention, each valve stem is hollow, in order to recover the air leakage from the compressed air actuating the piston against its return spring, said air leakage cooling the valve from the inside before being mixed together with the hot gases flow.

It will be understood that this entirely air-actuated system suppresses any fire hazards with respect to other systems using pressurized oil.

Reference should now be made to the accompanying drawings.

Figure 1:
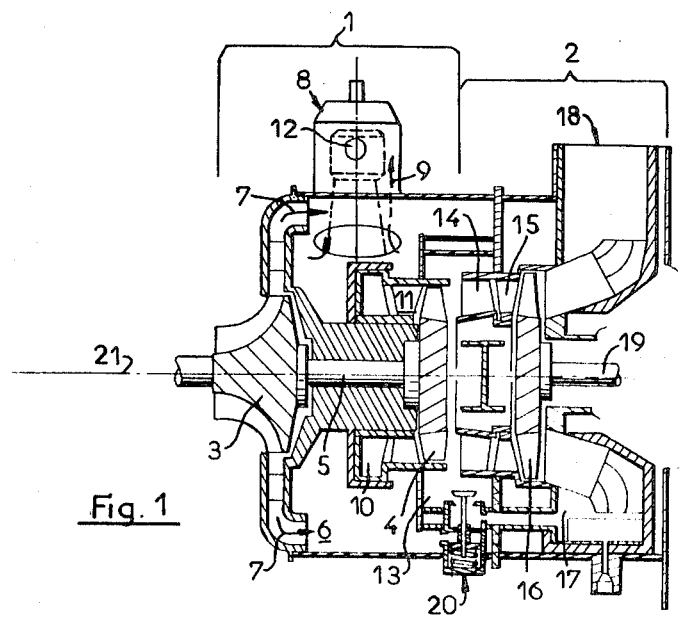
FIG. 1 is axial section of a lorry gas turbine provided with a device according to the invention, wherein each bypass valve is open in position of turbine stop or slow rotation.

The device shown in the drawings is mounted on a gas turbine, the general structure of which has already been described in applicant's copending U.S. application Ser. No. 831,901 filed June 10, 1969 in the name of the present applicant Jack Guillot. Such a device is preferably used with the cooling and temperature regulating system described in applicant's copending U.S. application Ser. No. 848,454 filed on Aug. 8, 1969 in the name of the same applicant, and to the combustion chamber system disclosed in the copending U.S. application Ser. No. 865,273, filed Oct. 10, 1969, still in the name of the present applicant.

This gas turbine comprises chiefly a gas generator unit 1 and a driving or output unit 2. The gas generator groups a rotor 3 of a centrifuge compressor and a rotor 4 of a high pressure turbine, both keyed on the same primary shaft 5. Air is blown from compressor 3 into an annular chamber 6 (arrows 7) and then into two combustion chambers 8 (arrows 9). The hot gases flowing out of the combustion chambers 8 are collected in an annular chamber 10; then they pass through the fixed blades of a first distributor 11 and through the blades of the high pressure rotor 4. To equalize the current of hot gases and to ensure that both combustion chambers 8 are always ignited, said combustion chambers are connected by means of a bypass channel 12.

Immediately downstream of the high pressure rotor 4 the hot gases are collected in an annular chamber 13. They flow out through a distributor 14, then through the fixed blades of a low pressure distributor 15, before actuating the blades of a low pressure turbine rotor 16. At the outlet of this rotor, the gases flow through a tapering annular collector 17, and they are evacuated outside through exhaust outlets 18.

The low pressure rotor 16 is keyed on the drive shaft 19 of the gas turbine. It will be understood that no direct mechanical connection exists between the primary shaft 5 of the gas generator 1, and the secondary shaft 19 of the output rotor 16.

Figure 2:
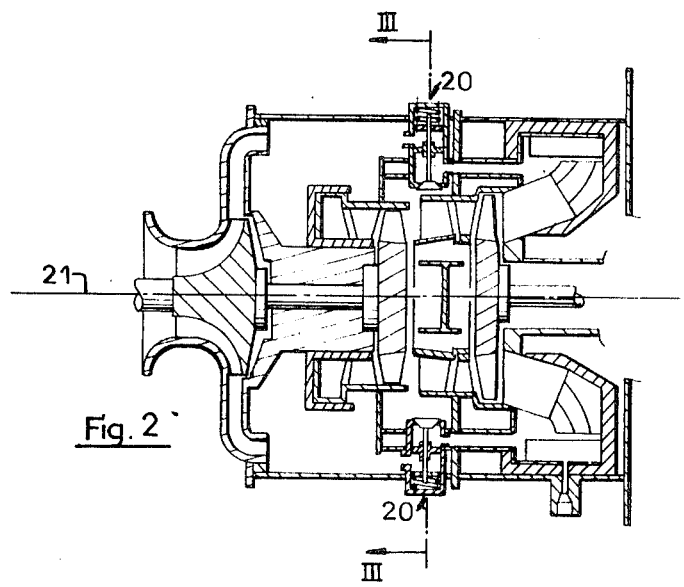
FIG. 2 is a similar axial section, wherein the bypass valves are closed for rotation of the turbine at full power.
Figure 3:
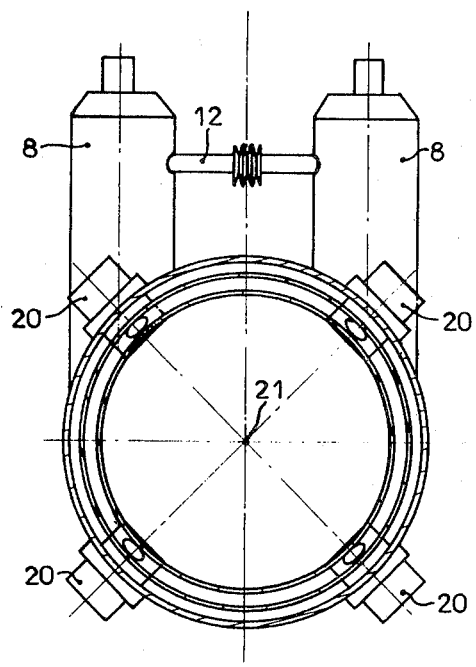
FIG. 3 is a section taken on the line III—III (FIG. 2) showing the arrangement of the four bypass valves on the gas turbine unit.

According to the invention, there is mounted between the annular chamber 13 and the exhaust collector 17, a number of bypass valves 20. The position of these valves on the gas turbine unit is illustrated in FIGS. 1 to 3, but the detail of said bypass valves appears in FIGS. 4 and 5. In FIG. 3, it has been supposed that four bypass valves 20 are located in the same transversal plane III—III and regularly distributed around the turbine general axis 21.

Figure 4:
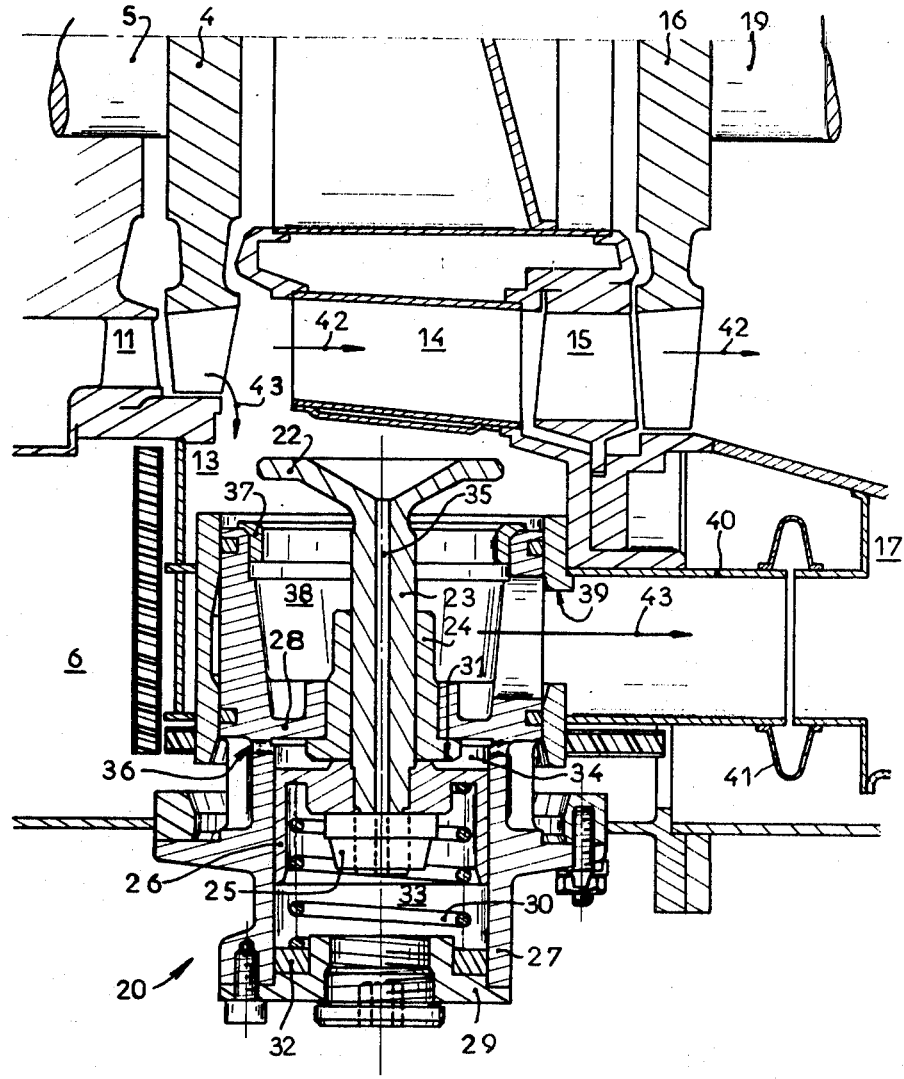
FIG. 4 and 5 show on an enlarged scale details of FIGS. 1 and 2 respectively.

Each bypass valve 20 has a head 22 and a stem 23. Said valve stem 23 is slidably mounted in a guide 24 behind which it is connected to a piston 26 by means of a threaded nut 25. The piston 26 slides gas tightly in a fixed cylinder 17, through the bottom 28 of which said guide 24 extends. At its opposite end the cylinder 27 is gas-tightly closed by an obturator 29. A coil spring 30 is mounted between the fixed bottom 29 and the piston 26 to urge same against an end surface 31 on the guide 24 (FIG. 4). By means of washers 32 having a calibrated thickness, it is possible to adjust the force of the coil spring 30.

Figure 5:
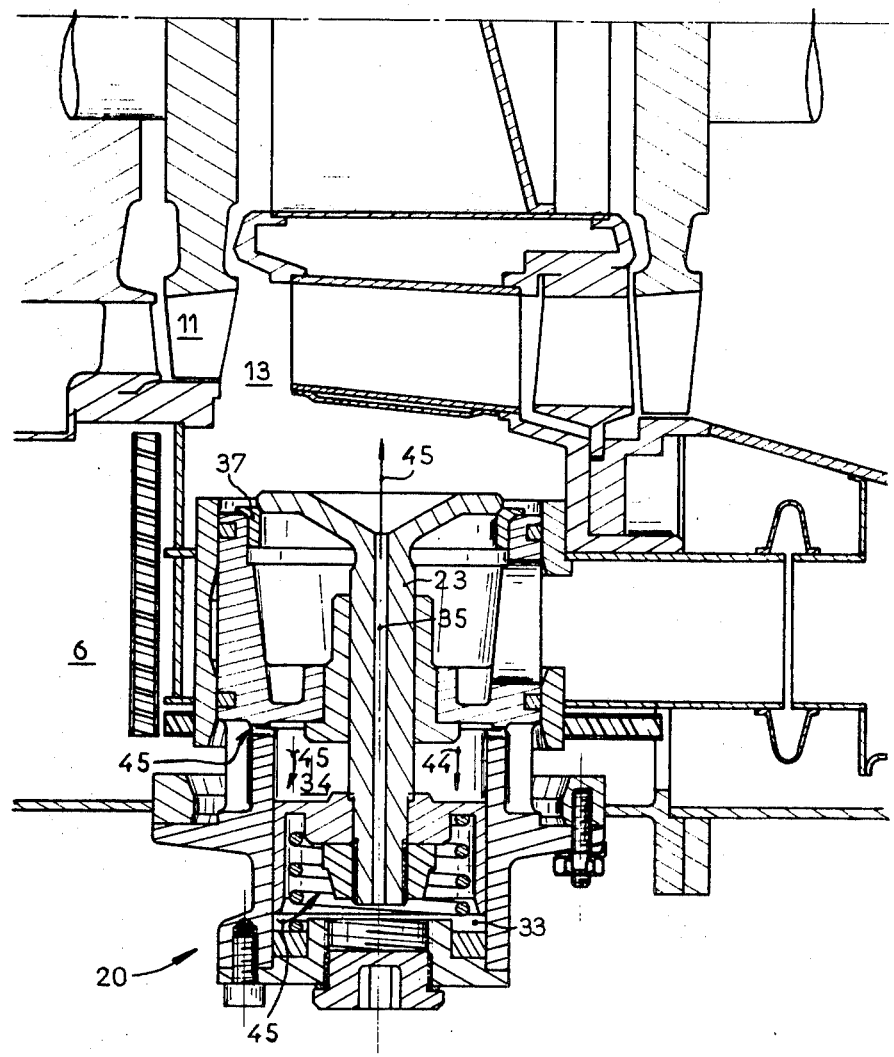

The piston 26 separates two chambers 33 and 34 within the cylinder 27. Chamber 33 is permanently connected to the annular chamber 23 of the valve. On the other hand, slots 36 opening through the wall of the cylinder 27 near the bottom 28, permanently connect the chamber 34 to the annular chamber or air collector 6 within which air is blown by the compressor rotor 3. The air pressure in collector 6 thus is transmitted to the chamber 34 and is applied onto the piston 26 against the action of the spring 30. When this air pressure is sufficient for compressing the spring 30, the valve 22, 23 is closed and the head 22 rests onto a fixed metal seat 37 (FIG. 5).

Between the seat 37 and the bottom 28 is defined around the guide 24, a chamber 38 directly connected by a wide opening 39 to the exhaust collector 17. A metal pipe 40 provided with a dilatation seal 41 is mounted between the opening 39 and the exhaust collector 17.

The operation is as follows:

When the gas turbine is stopped, the four bypass valves 20 are completely open (FIGS. 1 and 4). The chamber 13 located between the downstream face of high pressure rotor 4 and the upstream face of low pressure rotor 16 is directly connected by the bypass valves 20 to the exhaust collector 17. At this moment, if the turbine is started by starting the gas generator 1, only a part of the hot gases pass through the blades of the low pressure rotor 16 (arrows 42) and the remainder flow out directly through the outlets (arrows 43). Therefore, when the gas generator 1 is started, the gas expansion is more important within the high pressure distributor 11 which results in the following advantages:

reduction of the maximum starting temperature:
possibility of using a smaller drive starter:
reduction of the time necessary for starting:

After starting, as long as the gas turbine is running at idling speed, the bypass valves 20 remain completely open (FIGS. 1 and 4); the important gas expansion in the high pressure distributor 11 is still used and the resulting lower temperature provides a reduction of the fuel consumption.

When the rotation speed is increased, the bypass valves 20 begin to be closed. The air pressure delivered by the compressor in the air collector 6 is increased together with the output power on the shaft 19, the coil springs 30 are compressed under action of the pistons 26. Each piston 26 moves on in the direction of the arrow 44 (FIG. 5) as long as the air pressure increases in the chamber 34, until the bypass valve 22, 23 is completely closed on its seat 37. The springs 30 are adjusted in order that the bypass valve 22, 23 be completely closed at a speed corresponding to about 120 percent of the turbine idling speed. Thereafter, during all the turbine operation, the unavoidable air leakage between each piston 26 and cylinder 27 (arrows 45, FIG. 5) will flow through the central bore 35 in the valve stem 23, so that said valve is air-cooled from the inside. This air leakage is finally recovered in the chamber 13 before being directed to the low pressure rotor 16.

During the transitory operations, as soon as the turbine speed is reduced to the idling speed, the air pressure delivered by the compressor within the air collector 6 is also reduced and the bypass valves 20 opened again. It will be understood that the structure of those bypass valves and an appropriate choice of the diameters on the head 22 and piston 26 permit an operation by differential pressure compensation. More particularly, each valve 22, 23 is closed at a turbine rotation speed smaller than the rotation speed at which it is opened. This permits better accelerations for the gas generator 1, and it is particularly interesting for a gas turbine used in automobile vehicles.

Finally, it will be noticed that the bypass valves 32, 23 are operated by entirely pneumatic means, without using oil circulation. All fire hazards are thus suppressed and this is an important advantage comparatively to the hitherto known devices.

What I claim is:

1. A device for a gas turbine comprising a gas generator mechanically separated from an output rotary shaft, the latter carrying a turbine rotor, and at least one bypass valve located between the gas generator and the turbine output rotor, each bypass valve being submitted to the action of a calibrated spring which has a tendency to open it in order to partially deflect hot gases directly to exhaust, while the pressure of the air compressed in the gas generator before being sent into the combustion chambers acts in an opposite manner onto a piston fixed to each valve stem, said valve being closed as soon as said air pressure reaches a predetermined value, above which the entire flow of hot gases produced in the gas generator, passes through the blades of the output rotor, the bypass valves remaining closed.

2. A device as set forth in claim 1 wherein each bypass valve stem is hollow for circulation of the air leakage coming from the compressed air which actuates the piston against its return spring, said leakage circulation being provided for cooling the valve from the inside, whereafter the leakage air is mixed with the hot gases.

3. A device as set forth in claim 2 wherein four bypass valves are located at 90° in the same transversal plane around the turbine general axis.